(12) United States Patent
Weistrand

(10) Patent No.: US 10,453,199 B2
(45) Date of Patent: Oct. 22, 2019

(54) IMAGE PROCESSING SYSTEM AND METHOD FOR INTERACTIVE CONTOURING OF THREE-DIMENSIONAL MEDICAL DATA

(71) Applicant: RaySearch Laboratories AB, Stockholm (SE)

(72) Inventor: Ola Weistrand, Huddinge (SE)

(73) Assignee: RaySearch Laboratories AB, Stockholm (SE)

( * ) Notice: Subject to any disclaimer, the term of this patent is extended or adjusted under 35 U.S.C. 154(b) by 0 days.

(21) Appl. No.: 16/329,415

(22) PCT Filed: Sep. 4, 2017

(86) PCT No.: PCT/EP2017/072135
§ 371 (c)(1),
(2) Date: Feb. 28, 2019

(87) PCT Pub. No.: WO2018/042043
PCT Pub. Date: Mar. 8, 2018

(65) Prior Publication Data
US 2019/0197692 A1    Jun. 27, 2019

(30) Foreign Application Priority Data

Sep. 5, 2016  (EP) ..................................... 16187218

(51) Int. Cl.
*G06T 7/12* (2017.01)
*G06T 7/149* (2017.01)

(52) U.S. Cl.
CPC ................ *G06T 7/12* (2017.01); *G06T 7/149* (2017.01); *G06T 2207/10072* (2013.01); *G06T 2207/20096* (2013.01)

(58) Field of Classification Search
CPC .................................. G06T 7/12; G06T 7/149
See application file for complete search history.

(56) References Cited

U.S. PATENT DOCUMENTS

2008/0317308 A1* 12/2008 Wu ..................... G06K 9/4638
382/128
2011/0268330 A1   11/2011 Piper
(Continued)

OTHER PUBLICATIONS

De Bruin, P.W. et al., "Interactive 3D segmentation using connected orthogonal contours," Computers in Biology and Medicine 35 (2005) 329-346.
(Continued)

*Primary Examiner* — Ruiping Li
(74) *Attorney, Agent, or Firm* — Drinker Biddle & Reath LLP

(57) ABSTRACT

An anatomic structure of interest is contoured in 3D source data by selecting a first subset of data in a first image slice at a first axial position ($z1$). A first set of instructions identifies a first edge ($E1$) of the anatomic structure of interest in the first image slice. Then, a second subset of data is selected in a second image slice at a second axial position ($z2$); and a second set of instructions identifies a second edge ($E2$) of the anatomic structure of interest in the second image slice. A three-dimensional shell ($3DS$) is calculated based on the first and second edges ($E1$; $E2$) and the source data ($SD$). The three-dimensional shell ($3DS$) represents an approximation of a delimiting surface that separates the anatomic structure of interest from adjoining tissues in the 3D source data.

10 Claims, 4 Drawing Sheets

(56) References Cited

U.S. PATENT DOCUMENTS

2016/0093110 A1  3/2016  Waschbusch et al.
2017/0039725 A1* 2/2017  Dror ........................ G06T 7/12
2017/0301085 A1* 10/2017 Riklin Raviv ........ G06F 19/321

OTHER PUBLICATIONS

Lucas, Blake C. et al., "SpringLS: A Deformable Model Representation to Provide Interoperability between Meshes and Level Sets," Sep. 18, 2011, Network and Parallel Computing, pp. 442-450.
Wimmer, Andreas et al., "Two-Stage Semi-automatic Organ Segmentation Framework using Radial Basis Functions and Level Sets," 3D Segmentation in The Clinic, A Grand Challenge, 2007, pp. 179-188.
Pekar, V. et al., "Automated Model-Based Organ Delineation for Radiotherapy Planning in Prostatic Region," International Journal of Radiation Oncology—Biology—Physics, 2004, vol. 60, No. 3, 973-980.

* cited by examiner

IMAGE PROCESSING SYSTEM AND METHOD FOR INTERACTIVE CONTOURING OF THREE-DIMENSIONAL MEDICAL DATA

This application is the National Stage of International Application No. PCT/EP2017/072135, filed Sep. 4, 2017, and claims benefit of European Patent Application No. 16187218.9, filed Sep. 5, 2016, the entire contents of which are incorporated by reference herein.

THE BACKGROUND OF THE INVENTION AND PRIOR ART

The present invention relates generally to solutions for enhancing the information contents of medical image data. More particularly the invention relates to an image processing system according to the preamble of claim 1 and a corresponding method. The invention also relates to a computer program and a processor-readable medium.

The process of defining which voxels that represent a particular anatomic structure, or so-called organ delineation, is one of the most tedious and time-consuming parts of radiotherapy planning. This process usually involves manual contouring in two-dimensional slices using simple drawing tools, and it may take several hours to delineate all structures of interest in a three-dimensional data set of high resolution used for planning.

Pekar, V., et al., "Automated Model-Based Organ Delineation for Radiotherapy Planning in Prostatic Region", International Journal of Radiation Oncology—Biology—Physics, Vol. 60, No. 3, pp 973-980, 2004 discloses a method for adapting 3D deformable surface models to the boundaries of anatomic structures of interest. The adaptation is based on a tradeoff between deformations of the model induced by its attraction to certain image features and the shape integrity of the model. Problematic areas where the automated model adaptation may fail can be corrected via interactive tools.

US 2011/0268330 describes systems and methods for contouring a set of medical images. An example system may include an image database, an image deformation engine and a contour transformation engine. The image database may be used to store a set of medical images. The image deformation engine may be configured to receive a source image and a target image from the set of medical images in the image database, and may be further configured to use a deformation algorithm with the source image and the target image to generate deformation field data that is indicative of changes between one or more objects from the source image to the target image. The contour transformation engine may be configured to receive source contour data that identifies the one or more objects within the source image, and be further configured to use the deformation field data and the source contour data to generate automatic target contour data that identifies the one or more objects within the target image. The image deformation engine and the contour transformation engine may comprise software instructions stored in one or more memory devices and be executable by one or more processors.

Wimmer, A., et al, "Two-stage Semi-automatic Organ Segmentation Framework using Radial Basis Functions and Level Sets", 10$^{th}$ International Conference on Medical Image Computing and Computer Assisted Intervention, MICCAI 2007, 3D Segmentation in The Clinic: Grand Challenge, 29 Oct. 2007 (2007-10-29), pages 179-188 discloses a two-stage semi-automatic algorithm that is able to segment complex structures like the liver shape with moderate user interaction. A first stage of the algorithm involves manual delineation of cross-sections of the anatomical structure in 2D multi-planar reconstruction views. From this set of contours, an initial 3D surface is reconstructed using radial basis functions. In a second step, the surface is evolved using a level set algorithm incorporating a new combination of both image information and shape information, the latter being derived from the initial contours.

Problems Associated with the Prior Art

The above solutions may be capable of providing a satisfying end result for predefined types of organs, i.e. structures of interest within a certain range of shapes. However, it may be problematic and/or time consuming to delineate a general structure of interest whose shape does not fit a library of stored contours based upon which the delineation is performed.

SUMMARY OF THE INVENTION

The object of the present invention is therefore to offer a solution which, on one hand, requires a relatively low degree of manual intervention; and, on the other hand, provides an improved geometrical interpolation in a three-dimensional image data set.

According to one aspect of the invention, the object is achieved by the initially described arrangement; wherein, after having received the first set of instructions, the processing unit is configured to effect the following. Select a second subset of the source data defining a second two-dimensional graphic representation of the source data, which is arranged in a second image slice through the anatomic structure of interest at a second axial position in the source data. The second axial position is different from the first axial position. Then, the processing unit is configured to generate control instructions configured to cause the second interface to output the second subset of the source data for presentation on the graphical display. Via the third interface, the processing unit is configured to receive a second set of instructions identifying a second edge of the anatomic structure of interest in the second image slice. Thereafter, based on the first and second edges and the source data, the processing unit is configured to calculate a three-dimensional shell representing an approximation of a delimiting surface of the anatomic structure of interest.

This arrangement is advantageous because the joint use of the first and second edges and the source data enables reaching a high-quality delineation of the anatomic structure of interest in relatively few discrete steps. Other advantages are that no contour libraries are required. Further, the different subsets of source data need not be especially similar to one another. In other words, the image slices can be separated by a relatively large distance. Of course, this makes the solution highly flexible from a user perspective.

According to one embodiment of this aspect of the invention, the processing unit is configured to calculate an initial estimate of the three-dimensional shell between the first and second axial positions in the source data by exclusively interpolating between first and second sets of data points, where the first set of data points describes an outline of the first edge and the second set of data points describes an outline of the second edge. Thus, a reliable basis is established for the following approximation process.

According to another embodiment of this aspect of the invention, the first image slice has a first orientation in the source data and the second image slice is oriented in parallel with the first orientation. The processing unit is further configured to calculate the initial estimate of the three-dimensional shell by using a surface reconstruction algorithm, for instance an algorithm employing shape-based interpolation, or any other algorithm for computing a three-dimensional surface that approximates user drawn contours, for example a convex hull or similar. Thereby, the approximation process converges very quickly to an acceptable result for most types of anatomic structures.

Thus, preferably, the processing unit is configured to calculate a first subsequent estimate of the three-dimensional shell based on the initial estimate of the three-dimensional shell and the source data. Any subsequent estimates thereafter are calculated based on the previous estimate of the three-dimensional shell, the first and second edges and the source data. Thereby, the estimate of the three-dimensional shell is held geometrically close both to the manually drawn contours and the image data, which vouches for an end result of high-quality.

According to yet another embodiment of this aspect of the invention, the processing unit is further configured to analyze a first data portion of the first subset of the source data in proximity to the first edge, and analyze a second data portion of the second subset of the source data in proximity to the second edge. Based on these analyses, in turn, the processing unit is configured to derive a set of image features defining an estimated perimeter of the anatomic structure of interest, and calculate the subsequent estimate of the three-dimensional shell on the further basis of the set of image features, e.g. using interpolation based on harmonic functions, where the set of image features represent boundary conditions for the interpolation process. Consequently, although the character of the image features may vary considerably over the surface around the structure of interest, its perimeter can be estimated accurately. For example, this approach renders it relatively unproblematic to delineate a femoral head whose bone structure may have very strong edges at some parts of the structure and very weak at other parts (where instead the surrounding structures may have very strong edges).

According to still another embodiment of this aspect of the invention, the processing unit is configured to generate a first iteration of a triangular mesh structure approximating the three-dimensional shell to the estimated perimeter. The triangular mesh structure includes a set of vertices each in which a number of triangles of the mesh structure meet. Preferably, the processing unit is further configured to generate at least one further iteration of the triangular mesh structure in addition to the first iteration, where the at least one further iteration of the triangular mesh structure represents an approximation of the estimated perimeter that is an improvement relative to the first iteration with respect to an overall distance measure between the estimated perimeter and the vertices of the triangular mesh structure. Hence, the perimeter of the anatomic structure of interest can be expressed accurately through the triangular mesh structure, which enables efficient graphical processing and visualization.

According to one further embodiment of this aspect of the invention, the processing unit is configured to select at least one further subset of the source data in addition to the first and second subsets. The at least one further subset defines at least one further two-dimensional graphic representation of the source data arranged in at least one further image slice through the anatomic structure of interest at at least one further axial position in the source data. The at least one further axial position is different from the first and second axial positions. For each of the at least one further subset, the processing unit is configured to generate control instructions configured to cause the second interface to output the at least one further subset of the source data for presentation on the graphical display. Then, in response to at least one further set of instructions received via the third interface, the processing unit is configured identify at least one further edge of the anatomic structure of interest in the at least one further image slice. Subsequently, based on the first, second and at least one further edges and the source data, where the processing unit is configured to calculate an improved version of the three-dimensional shell representing a surface estimate of the anatomic structure of interest. This means that the user can conveniently assist and speed up the automatic delineation process by adding one or more manually drawn contours.

According to yet another embodiment of this aspect of the invention, the third interface is configured to forward a supplementary set of instructions to the processing unit, which the supplementary set of instructions identifies an adjusted edge of the anatomic structure of interest in at least one of said image slices. Moreover, the processing unit is configured to calculate the three-dimensional shell on the further basis of the adjusted edge. Thus, the user can also fine-tune the delineation process by manually changing the outline of an edge of the anatomic structure of interest in an intuitive manner.

According to still another embodiment of this aspect of the invention, the third interface is specifically configured to receive the sets of instructions in the form of user commands, for example generated via a computer mouse or similar pointing device.

According to another aspect of the invention, the object is achieved by the method described initially; wherein, after having received the first set of instructions, a second subset of the source data selected, which second subset defines a second two-dimensional graphic representation of the source data. The second subset is arranged in a second image slice through the anatomic structure of interest at a second axial position in the source data, which second axial position is different from the first axial position. Via the second interface, the second subset of the source data is output for presentation on the graphical display. Thereafter, in response to a second set of instructions received via the third interface, a second edge of the anatomic structure of interest is identified in the second image slice. Finally, a three-dimensional shell is calculated based on the first and second edges and the source data. The three-dimensional shell represents an approximation of a delimiting surface of the anatomic structure of interest. The advantages of this method, as well as the preferred embodiments thereof, are apparent from the discussion above with reference to the proposed system.

According to a further aspect of the invention the object is achieved by a computer program loadable into the memory of at least one processor, and includes software adapted to implement the method proposed above when said program is run on at least one processor.

According to another aspect of the invention the object is achieved by a processor-readable medium, having a program recorded thereon, where the program is to control at least one processor to perform the method proposed above when the program is loaded into the at least one processor.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DESCRIPTION OF PREFERRED EMBODIMENTS OF THE INVENTION

Figure 1:
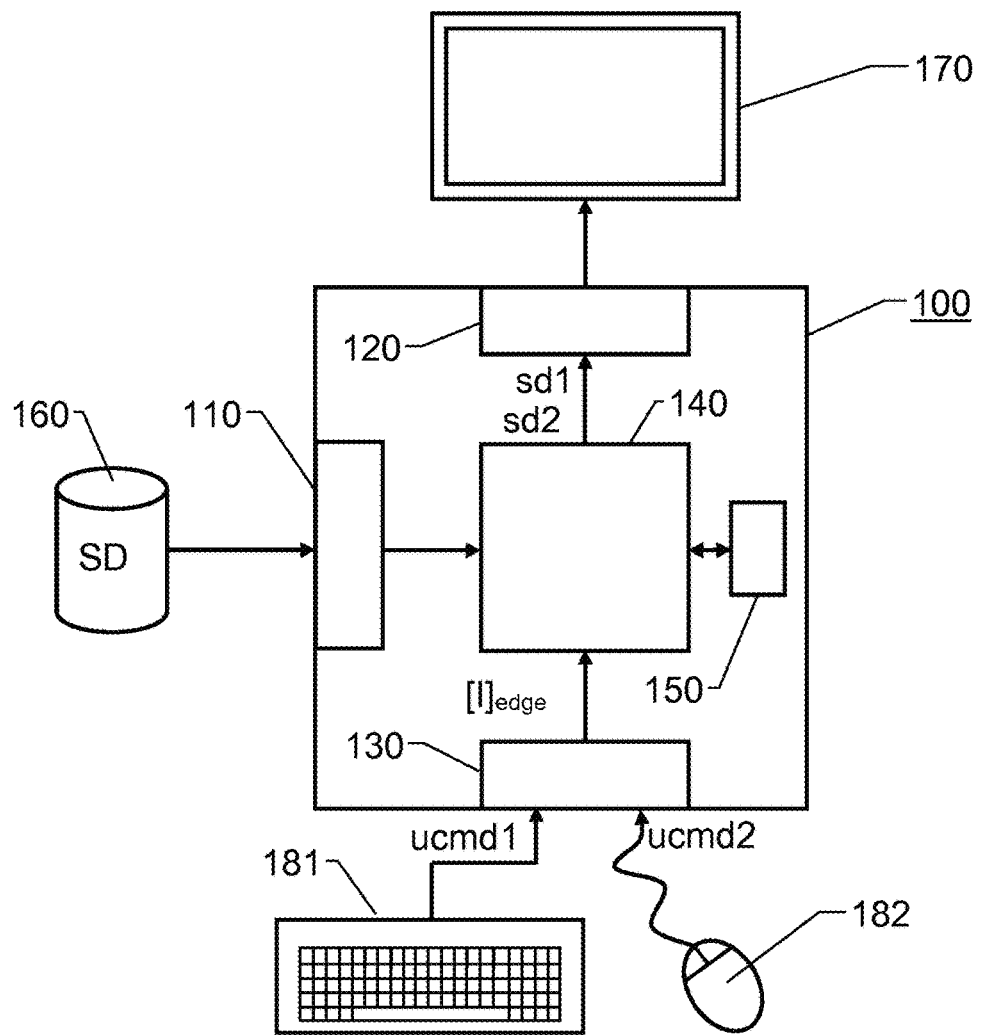
FIG. 1 shows an overview of a system according to one embodiment of the invention.

FIG. 1 shows an overview of an image processing system 100 for contouring three-dimensional medical image data according to one embodiment of the invention. The system 100 includes a processing unit 140 plus first, second and third interfaces 110, 120 and 130 respectively. Preferably, a memory 150 is also included, which stores software for executing the below-described procedure when the software is being run on the processing unit 140. For presentation purposes, FIG. 1 illustrates the interfaces 110, 120 and 130 as separate entities. However, in a practical implementation, two or more of the interfaces may be integrated into a common unit.

The first interface 110 is configured to enable the processing unit 140 access to source data SD in the form of three-dimensional medical image data that represent an anatomic structure of interest. The source data SD also contains tissues adjoining the anatomic structure of interest. The purpose of the proposed system 100 is to contour, or delineate, the anatomic structure of interest so that this structure can be distinguished from the adjoining tissues, for example in order to plan a radiotherapy treatment of the anatomic structure of interest.

Figure 2:
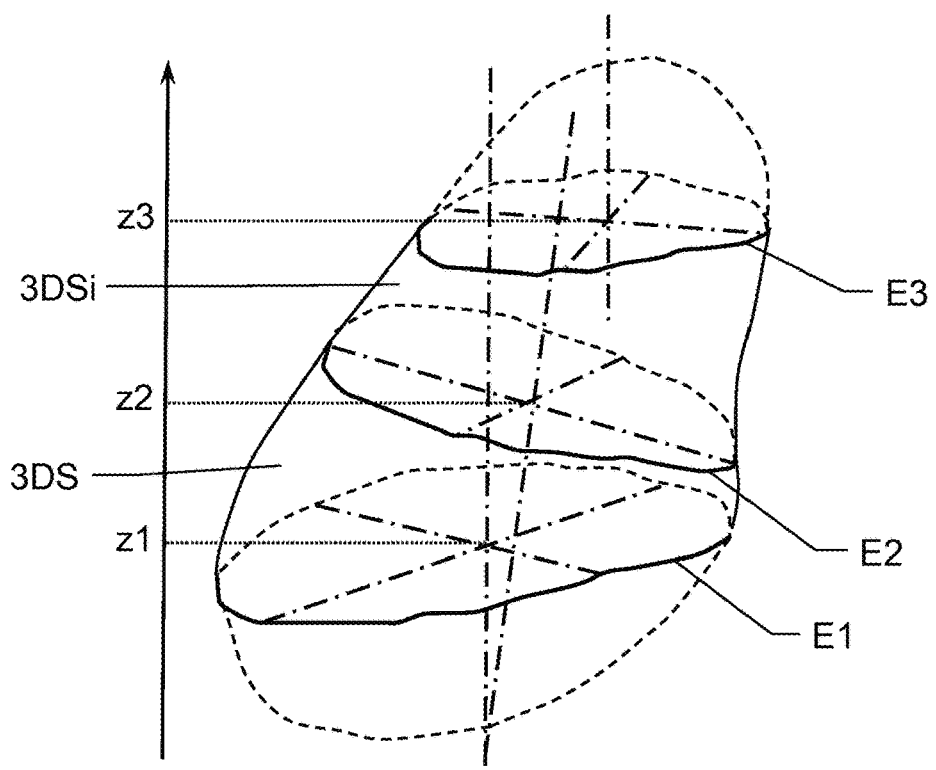
FIG. 2 illustrates how the edges of the anatomic structure of interest may be identified in different image slices in the source data according to embodiments of the invention.

Referring now also to FIG. 2, the processing unit 140 is configured to select a first subset sd1 of the source data SD defining a first two-dimensional graphic representation of the source data SD arranged in a first image slice through the anatomic structure of interest at a first axial position z1 in the source data SD.

The second interface 120 is configured to output the first subset of the source data sd1 for presentation on a graphical display 170. The first subset of the source data sd1 is output in response to control instructions from the processing unit 140.

The third interface 130 is configured to forward a first set of instructions $[I]_{edge}$ to the processing unit 140. The first set of instructions $[I]_{edge}$ identifies a first edge E1 of the anatomic structure of interest in the first image slice, and is preferably generated in response to user commands ucmd1 and/or ucmd2 entered via a keyboard and/or computer mouse, or similar pointing device.

FIG. 2 illustrates how the first edge E1 follows the shape the anatomic structure of interest in the source data SD in the first subset of the source data sd1 represented by the first image slice.

After having received the first set of instructions $[I]_{edge}$, the processing unit 140 is configured to select a second subset sd2 of the source data SD defining a second two-dimensional graphic representation of the source data SD. The second subset sd2 is arranged in a second image slice through the anatomic structure of interest at a second axial position z2 in the source data SD. The second axial position z2 is different from the first axial position z1. In other words, the second subset sd2 contains separate two-dimensional slice of data from the source data SD, and this slice of data may or may not be parallel with the slice represented by the first subset sd1. As will be explained below, however, it is advantageous if the first and second image slices are indeed parallel to one another.

The processing unit is configured to generate control instructions adapted to cause the second interface 120 to output the second subset sd2 of the source data SD for presentation on the graphical display 170, i.e. such that a user can observe it visually and generate commands for describing a second edge E2 of the anatomic structure of interest in the second image slice Therefore, the processing unit is also configured to receive, via the third interface 130, a second set of instructions $[I]_{edge}$ identifying the second edge E2 of the anatomic structure of interest in the second image slice. Analogous to the above, the second set of instructions $[I]_{edge}$ is preferably generated in response to user commands ucmd1 and/or ucmd2 entered via a keyboard and/or computer mouse, or similar pointing device.

Finally, the processing unit 140 is configured to calculate a three-dimensional shell 3DS based on the first and second edges E1 and E2 respectively and the source data SD. Here, the three-dimensional shell 3DS represents an approximation of a delimiting surface of the anatomic structure of interest. The three-dimensional shell 3DS may be computed by means of a deformable surface model, which is adapted iteratively by solving a non-linear optimization problem that incorporates both the source data SD and geometric distances to the first and second edges E1 and E2 in the objective function. This approach is beneficial because it ensures that the three-dimensional shell 3DS is tied closely to the user input, i.e. the user commands ucmd1 and/or ucmd2 defining the first and second edges E1 and E2. It also reaches a high-quality result in relatively few discrete steps. Provided that the first and second subsets sd1 and sd2 respectively represent parallel image slices, an initial estimate of the three-dimensional shell 3DS may be calculated by using a surface reconstruction algorithm, e.g. an algorithm employing shape-based interpolation, or any other algorithm for computing a three-dimensional surface approximating user drawn contours, for example a convex hull or similar. Namely, thereby, the approximation process converges very quickly to an acceptable result for most types of anatomic structures.

In retrospect, the user may realize that an already drawn contour, e.g. the first edge E1 and/or the second edge E2, should have had a somewhat different outline to better match the image contents of source data SD. Therefore, according to one embodiment of the invention, the third interface 130 is configured to forward a supplementary set of instructions $[I]_{edge}$ to the processing unit 140, which supplementary set of instructions $[I]_{edge}$ identifies an adjusted edge of the anatomic structure of interest in at least one of said image slices. Again, preferably, the supplementary set of instructions $[I]_{edge}$ is generated in response to user commands ucmd1 and/or ucmd2 that have been entered via a keyboard and/or computer mouse, or similar pointing device. The processing unit 140 is further configured to calculate the three-dimensional shell 3DS on the further basis of the adjusted edge.

Figure 3:
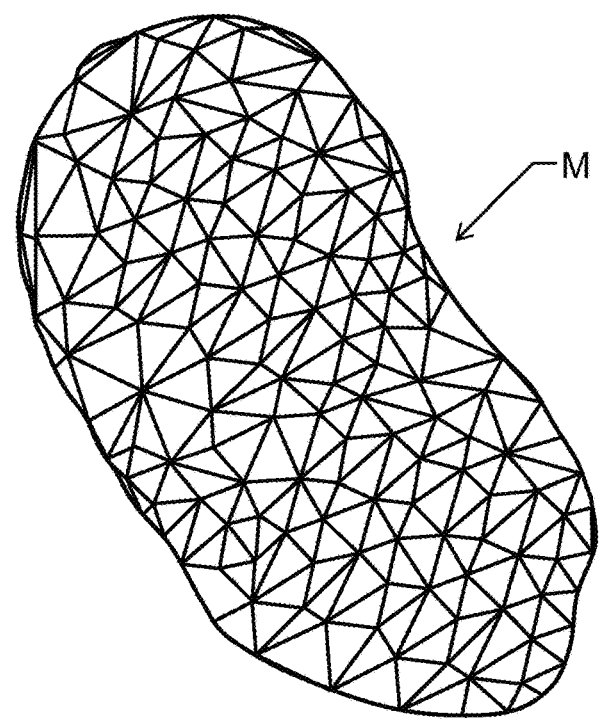
FIG. 3 shows an example of a triangular mesh generated according one embodiment of the invention.

FIG. 3 shows an example of a triangular mesh M that approximates the three-dimensional shell 3DS to an estimated perimeter P of the anatomic structure of interest. The triangular mesh structure M includes a set of vertices v each in which a number of triangles of the mesh structure M meet. A triangular-mesh representation of this type is beneficial because it enables efficient graphical processing and visualization of the data.

Therefore, the processing unit 140 is preferably configured to generate a first iteration of the triangular mesh structure M based on triangulation and shaped-based interpolation. The mesh structure M is then successively adapted to match the first and second edges E1 and E2 respectively and the source data SD in a discrete number of steps. Here, a current approximating surface is used as constraining surface to the adaptation. In an initial approximation, this surface is denoted 3DS'.

Figure 4:
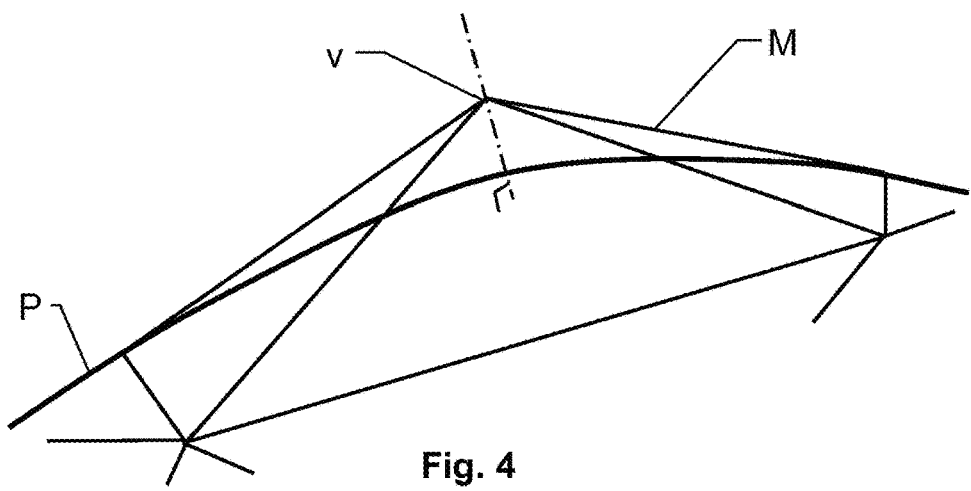
FIG. 4 illustrates a distance measure in relation to the proposed triangular mesh.

Preferably, the processing unit 140 is configured to generate at least one further iteration of the triangular mesh structure M in addition to the first iteration, where the at least one further iteration of the triangular mesh structure M represents an approximation of the estimated perimeter P, which is an improvement relative to the first iteration with respect to an overall distance measure between the estimated perimeter P and the vertices v of the triangular mesh structure M. FIG. 4 schematically shows this distance measure in relation to the triangular mesh M and the estimated perimeter P.

Figure 5:
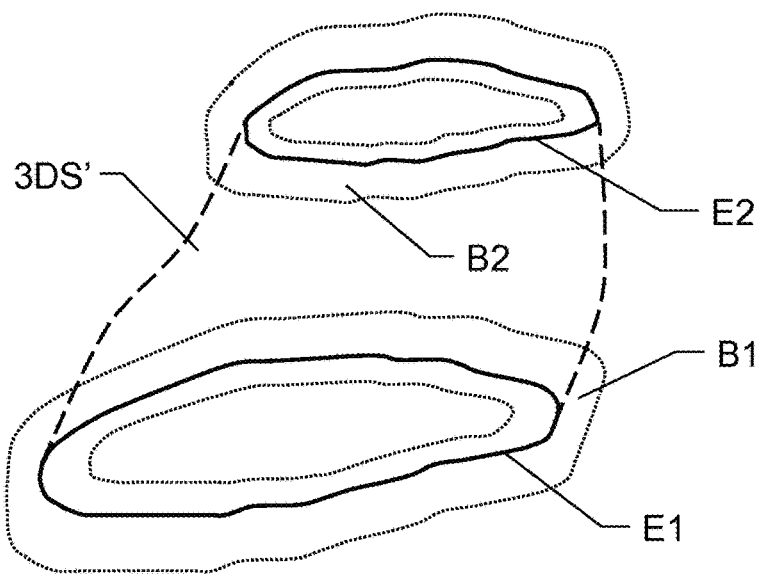
FIG. 5 illustrates how source data in proximity to drawn edges are analyzed according to one embodiment of the invention.

As discussed briefly above, the character of the image features defining the estimated perimeter P may vary considerably over the surface around the structure of interest. In a challenging scenario, the structure of interest has very strong edges at some parts of its delimiting surface, and very weak edges at other parts. Close the latter parts, the surrounding structures/tissues may instead have very strong edges. To handle this problem, FIG. 5 illustrates how parts of the source data SD in proximity to the edges E1 and E2 are analyzed according to one embodiment of the invention.

In this embodiment of the invention, the processing unit 140 is configured to analyze a first data portion B1 of the first subset sd1 of the source data SD in proximity to the first edge E1, and analyze a second data portion B2 of the second subset sd2 of the source data SD in proximity to the second edge E2. Based on these analyses, the processing unit 140 is configured to derive a set of image features defining an estimated perimeter P of the anatomic structure of interest; and on the further basis of the set of image features, calculate the subsequent estimate of the three-dimensional shell 3DS.

Preferably, these image features, which are derived locally around the first and second edges E1 and E2 respectively, are interpolated onto the estimate of the three-dimensional shell 3DS using a harmonic function. For example, the processing unit 140 can be configured to interpolate the set of image features defining the estimated perimeter P over the initial estimate 3DS' by using harmonic functions. Here, image features derived from the first and second data portions B1 and B2 represent boundary conditions for the interpolation process.

Thereby, also highly complex surfaces can be identified and modeled accurately, such as the bone structure of the femoral head. Structures in magnetic resonance images can also be delineated successfully, even if the intensity here varies considerably over the surface of the structures.

Returning now to FIG. 2, we will describe another embodiment of the invention. Depending on the shape of the anatomic structure of interest different numbers of edges may be appropriate to draw in order to attain an adequate delineation of the structure. Generally, a structure having many concave surface elements requires that the user defines more edges than a structure having an overall convex shape.

Hence, for improved flexibility, the processing unit 140 is preferably configured to select at least one further subset of the source data SD in addition to the first and second subsets sd1 and sd2 respectively. FIG. 2 shows an example of such a subset sd3 that defines a further two-dimensional graphic representation of the source data SD arranged in at least one further image slice through the anatomic structure of interest. The further subset sd3 is located at a further axial position z3 in the source data SD, which further axial position z3 is different from the first and second axial positions z1 and z2.

In the example shown in FIG. 2, the further subset sd3 represents an image slice that is parallel with the image slice represented by the first subset sd1. Such a parallel orientation is advantageous, since it allows the three-dimensional shell 3DS to be calculated by using a surface reconstruction algorithm, e.g. an algorithm employing shape-based interpolation. This, in turn, generally leads to that the approximation process converges very quickly to an acceptable result for most types of anatomic structures.

For the further subset sd3 of the source data SD (or for each further subset, if there are more than one), the processing unit 140 is configured to generate control instructions adapted to cause the second interface 120 to output the further subset sd3 for presentation on the graphical display 170, so that a user may observe this image data visually.

The processing unit 140 is configured to receive, via the third interface 130, a further set of instructions $[I]_{edge}$ identifying at least one further edge E3 of the anatomic structure of interest in the further image slice. Analogous to the above, the further set of instructions $[I]_{edge}$ the further set of instructions $[I]_{edge}$ is preferably generated in response to user commands ucmd1 and/or ucmd2 that have been entered via a keyboard and/or computer mouse, or similar pointing device.

The processing unit 140 is configured to calculate improved version 3DSi of the three-dimensional shell based on the first, second and further edges E1, E2 and E3 respectively and the source data SD. Here, the improved version 3DSi of the three-dimensional shell represents an updated surface estimate of the anatomic structure of interest.

It is generally advantageous if the processing unit 140 is configured to effect the above-mentioned procedure by executing a computer program. The processing unit 140 is therefore preferably communicatively connected to a memory unit storing a computer program product, which, in turn, contains instructions executable by the processing unit 140; whereby the processing unit 140 is operative to execute the above-described actions when the computer program product is run on the processing unit 140.

Figure 6:
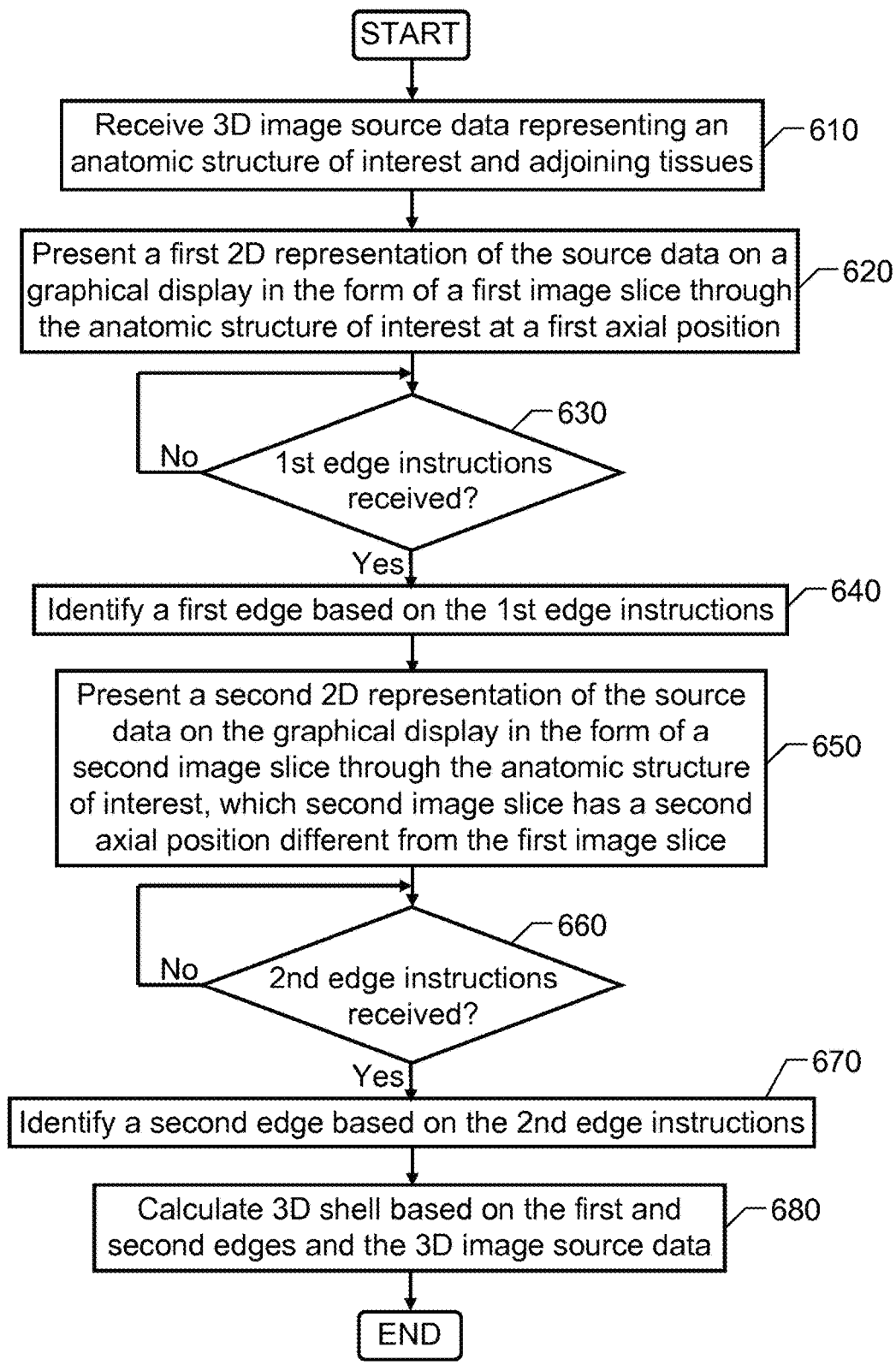
FIG. 6 illustrates, by means of a flow diagram, the general method according to the invention.

In order to sum up, and with reference to the flow diagram in FIG. 6, we will now describe the general method according to the invention for contouring three-dimensional medical image data.

In a first step 610, source data are received, which represent a 3D image of an anatomic structure of interest as well as tissues adjoining the anatomic structure of interest.

Then, in a step 620, a first subset of the source data is selected and presented on a graphical display. The first subset of the source data defines a first two-dimensional graphic representation of the source data, and the first subset is arranged in a first image slice through the anatomic structure of interest at a first axial position in the source data.

Subsequently, a step 630 checks if a first set of instructions has been received. Preferably, the first set of instructions are generated in response to manual commands entered by a user, for example via a computer mouse. If such a first set of instructions has been received, the procedure continues to a step 640. Otherwise, the procedure loops back and stays in step 630.

In step 640, a first edge of the anatomic structure of interest is identified in the first image slice in response to the first set of instructions. Preferably, graphics illustrating the first edge is also presented on the graphical display as feedback to the user.

Then, in a step 650, a second subset of the source data is selected and presented on the graphical display. The second subset of the source data defines a second two-dimensional graphic representation of the source data, and the second subset is arranged in a second image slice through the anatomic structure of interest at a second axial position in the source data, which second axial position is different from the first axial position.

Subsequently, a step 660 checks if a second set of instructions has been received. Analogous to the above, the second set of instructions are preferably generated in response to manual commands entered by a user, for example via a computer mouse. If such a second set of instructions has been received, the procedure continues to a step 670. Otherwise, the procedure loops back and stays in step 660.

In step 670, a second edge of the anatomic structure of interest is identified in the second image slice in response to the second set of instructions.

Figure 7:
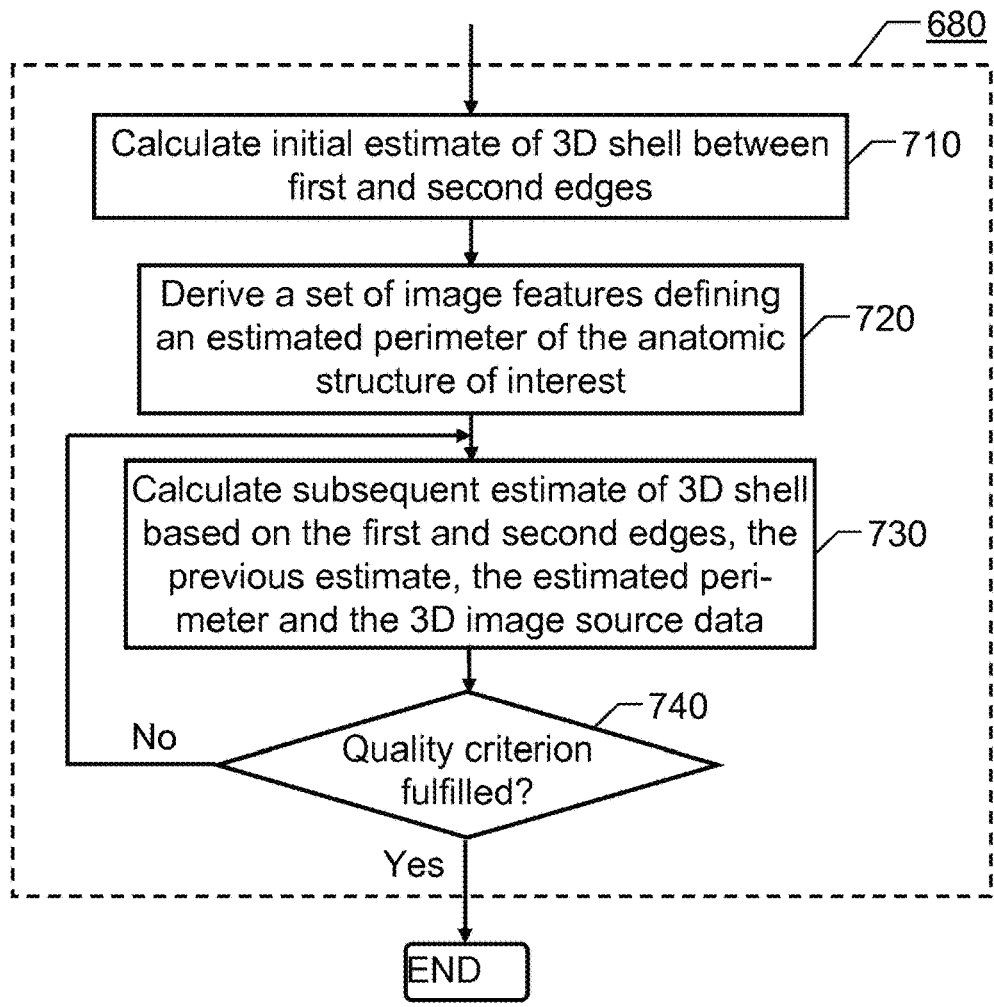
FIG. 7 shows a part of a flow diagram illustrating one embodiment of the proposed method.

Thereafter, in a step 680, a three-dimensional shell is calculated based on the first and second edges and the source data. The three-dimensional shell represents an approximation of a delimiting surface of the anatomic structure of interest, and the three-dimensional shell, as such, is calculated iteratively. FIG. 7 shows a flow diagram illustrating how this can be effected according to one embodiment of the invention.

Here, in a first step 710, an initial estimate of the three-dimensional shell between the first and second axial positions in the source data is calculated by interpolating between first and second sets of data points. The first set of data points describes a first outline of the first edge, and the second set of data points describes a second outline of the second edge.

After that, in a step 720, a set of image features is derived, which define an estimated perimeter of the anatomic structure of interest. Preferably, the set of image features is derived based on analyses of the source data in proximity to the first and second edges respectively.

Then, in a step 730, a subsequent estimate of the three-dimensional shell is calculated based on the previous estimate of the three-dimensional shell (i.e. in a first iteration the initial estimate), the first and second edges, the set of image features and the source data.

Subsequently, a step 740 checks if a quality criterion is fulfilled, where for example the criterion is expressed in terms of a non-linear optimization problem incorporating both image information and geometric distance to the first and second edges in the objective function. If said criterion is fulfilled, the procedure ends. Otherwise, it loops back to step 730.

All of the process steps, as well as any sub-sequence of steps, described with reference to FIGS. 6 and 7 above may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EP-ROM (Erasable Programmable Read-Only Memory), an EEP-ROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. An image processing system for contouring three-dimensional medical image data, the system comprising:
 a processing unit; and
 first, second, and third interfaces,
 the first interface being configured to enable the processing unit access to source data in the three-dimensional medical image data, which source data represent an anatomic structure of interest that is to be contoured, and tissues adjoining the anatomic structure of interest;
 the processing unit being configured to select a first subset of the source data defining a first two-dimensional graphic representation of the source data arranged in a first image slice through the anatomic structure of interest at a first axial position in the source data;
 the second interface being configured to, in response to control instructions from the processing unit, output the first subset of the source data for presentation on a graphical display; and the third interface being configured to forward a first set of instructions to the processing unit, the first set of instructions being received in the third interface in the form of user commands and identifying a first edge of the anatomic structure of interest in the first image slice, wherein after having received the first set of instructions, the processing unit is configured to:

select a second subset of the source data defining a second two-dimensional graphic representation of the source data arranged in a second image slice through the anatomic structure of interest at a second axial position in the source data, which second axial position is different from the first axial position;

generate control instructions configured to cause the second interface to output the second subset of the source data for presentation on the graphical display;

receive, via the third interface, a second set of instructions identifying a second edge of the anatomic structure of interest in the second image slice;

calculate a three-dimensional shell based on the first and second edges and the source data, the three-dimensional shell representing an approximation of a delimiting surface of the anatomic structure of interest;

calculate an initial estimate of the three-dimensional shell between the first and second axial positions in the source data by interpolating between first and second sets of data points, the first set of data points describing a first outline of the first edge and the second set of data points describing a second outline of the second edge;

analyze a first data portion of the first subset of the source data in proximity to the first edge;

analyze a second data portion of the second subset of the source data in proximity to the second edge, based thereon; and derive a set of image features defining an estimated perimeter of the anatomic structure of interest, and calculate the subsequent estimate of the three-dimensional shell on the further basis of the set of image features, wherein the processing unit is further configured to interpolate the set of image features defining the estimated perimeter over the initial estimate by using harmonic functions, and where image features derived from the first and second data portions represent boundary conditions.

2. The image processing system according to claim 1, wherein:

the first image slice has a first orientation in the source data and the second image slice is oriented in parallel with the first orientation, and the processing unit is configured to calculate the initial estimate of the three-dimensional shell by using a surface reconstruction algorithm.

3. The image processing system according to claim 2, wherein the processing unit is configured to calculate a subsequent estimate of the three-dimensional shell based on: the initial estimate of the three-dimensional shell, the first and second edges, and the source data.

4. The image processing system according to claim 1, wherein the processing unit is further configured to:

generate a first iteration of a triangular mesh structure approximating the three-dimensional shell to the estimated perimeter, the triangular mesh structure including a set of vertices each in which a number of triangles of the mesh structure meet.

5. The image processing system according to claim 4, wherein the processing unit is further configured to generate at least one further iteration of the triangular mesh structure in addition to the first iteration, the at least one further iteration of the triangular mesh structure representing an approximation of the estimated perimeter which is an improvement relative to the first iteration with respect to an overall distance measure between the estimated perimeter and the vertices of the triangular mesh structure.

6. The image processing system according to claim 2, wherein the processing unit is configured to:

select at least one further subset of the source data in addition to the first and second subsets, the at least one further subset defining at least one further two-dimensional graphic representation of the source data arranged in at least one further image slice through the anatomic structure of interest at at least one further axial position in the source data, which at least one further axial position is different from the first and second axial positions;

generate, for each of the at least one further subset, control instructions configured to cause the second interface to output the at least one further subset of the source data for presentation on the graphical display;

receive, via the third interface, at least one further set of instructions identifying at least one further edge of the anatomic structure of interest in the at least one further image slice; and calculate, based on the first, second, and at least one further edges and the source data, an improved version of the three-dimensional shell representing a surface estimate of the anatomic structure of interest.

7. The image processing system according to claim 1, wherein:

the third interface is configured to forward a supplementary set of instructions to the processing unit, the supplementary set of instructions identifying an adjusted edge of the anatomic structure of interest in at least one of said image slices; and the processing unit is configured to calculate the three-dimensional shell on the further basis of the adjusted edge.

8. A processor-implemented method of contouring three-dimensional medical image data, the method comprising:

receiving, via a first interface, source data in the three-dimensional medical image data, which source data represent an anatomic structure of interest that is to be contoured, and tissues adjoining the anatomic structure of interest;

selecting a first subset of the source data defining a first two-dimensional graphic representation of the source data, the first subset being arranged in a first image slice through the anatomic structure of interest at a first axial position in the source data;

outputting, via a second interface, the first subset of the source data for presentation on a graphical display;

receiving a first set of instructions in a third interface in the form of user commands;

identifying, in response to the first set of instructions received via the third interface, a first edge of the anatomic structure of interest in the first image slice, and, after having received the first set of instructions:

selecting a second subset of the source data defining a second two-dimensional graphic representation of the source data, the second subset being arranged in a second image slice through the anatomic structure of interest at a second axial position in the source data, which second axial position is different from the first axial position;

outputting, via the second interface, the second subset of the source data for presentation on the graphical display;

identifying, in response to a second set of instructions received via the third interface, a second edge of the anatomic structure of interest in the second image slice;

calculating a three-dimensional shell based on the first and second edges and the source data, the three-dimensional shell representing an approximation of a delimiting surface of the anatomic structure of interest;

calculating an initial estimate of the three-dimensional shell between the first and second axial positions in the source data by interpolating between first and second sets of data points, the first set of data points describing a first outline of the first edge and the second set of data points describing a second outline of the second edge;

analyzing a first data portion of the first subset of the source data in proximity to the first edge;

analyzing a second data portion of the second subset of the source data in proximity to the second edge, and based thereon deriving a set of image features defining an estimated perimeter of the anatomic structure of interest, and calculating the subsequent estimate of the three-dimensional shell on the further basis of the set of image features; and interpolating the set of image features defining the estimated perimeter over the initial estimate by using harmonic functions, and where image features derived from the first and second data portions represent boundary conditions.

9. A computer program loadable into the memory of at least one processing unit, comprising software for executing the method according claim 8 when the program is run on the at least one processing unit.

10. A non-transitory processor-readable medium, having a program recorded thereon, where the program is to make at least one processing unit execute the method according to claim 8 when the program is loaded into the at least one processing unit.

* * * * *